US008623485B2

(12) United States Patent
Asano et al.

(10) Patent No.: US 8,623,485 B2
(45) Date of Patent: Jan. 7, 2014

(54) ADHESIVE UNIT FOR EMBLEM, METHOD OF PRODUCING THE SAME, JIG FOR ADHERING EMBLEM AND EMBLEM FOR ADHESION

(75) Inventors: Yoshihiko Asano, Shiga (JP); Isao Hirose, Osaka (JP); Shinji Inokuchi, Osaka (JP); Tokuhisa Kosaka, Osaka (JP)

(73) Assignees: Nitto Denko Corporation, Osaka (JP); Nissho Corporation, Osaka (JP)

( * ) Notice: Subject to any disclaimer, the term of this patent is extended or adjusted under 35 U.S.C. 154(b) by 533 days.

(21) Appl. No.: 12/254,372

(22) Filed: Oct. 20, 2008

(65) Prior Publication Data

US 2009/0104393 A1    Apr. 23, 2009

(30) Foreign Application Priority Data

Oct. 19, 2007   (JP) ................................. 2007-272878

(51) Int. Cl.
| | |
|---|---|
| *B32B 3/02* | (2006.01) |
| *B32B 3/22* | (2006.01) |
| *B32B 3/24* | (2006.01) |
| *B32B 7/06* | (2006.01) |
| *B32B 7/14* | (2006.01) |
| *B32B 37/02* | (2006.01) |
| *B32B 38/04* | (2006.01) |
| *B32B 38/10* | (2006.01) |
| *B29C 65/48* | (2006.01) |
| *B44C 1/28* | (2006.01) |
| *B29C 65/50* | (2006.01) |
| *B44C 1/18* | (2006.01) |
| *B60R 13/00* | (2006.01) |

(52) U.S. Cl.
USPC ........... 428/41.8; 428/31; 428/40.1; 428/134; 428/136; 428/137; 428/192; 156/247; 156/248; 156/249; 156/256; 156/257; 156/289; 156/391; 156/719

(58) Field of Classification Search
USPC ....................................................... 428/41.8
See application file for complete search history.

(56) References Cited

U.S. PATENT DOCUMENTS 4,588,627 A *  5/1986  Isaksen et al. .................. 428/80
5,226,993 A *  7/1993  Tukakoshi et al. .............. 156/63

(Continued)

FOREIGN PATENT DOCUMENTS

| CN | 1696229 A | 11/2005 |
| CN | 1800285 A | 7/2006 |

(Continued)

OTHER PUBLICATIONS

English Abstract for JP 2005-179561 A, Jul. 2005.*

(Continued)

*Primary Examiner* — David Sample
*Assistant Examiner* — Jeff Vonch
(74) *Attorney, Agent, or Firm* — Sughrue Mion, PLLC (57) ABSTRACT

The present invention provides an adhesive unit for emblem, which includes: a plurality of double-faced adhesive pieces each having a shape corresponding to a shape of a respective one of a plurality of emblem pieces; a first release film attached to a face of each of the plurality of double-faced adhesive pieces to be adhered to an emblem, so that a mutual positional relationship of the plurality of double-faced adhesive pieces is maintained; and a second release film attached to the other face of each of the plurality of double-faced adhesive pieces opposite to the face to be adhered to the emblem. The present invention also provides a method of producing the adhesive unit for emblem, a jig for adhering emblem, and an emblem for adhesion.

9 Claims, 3 Drawing Sheets

(56) References Cited

U.S. PATENT DOCUMENTS

| | | | |
|---|---|---|---|
| 6,071,583 A * | 6/2000 | Pomerantz | 428/40.1 |
| 6,641,910 B1 * | 11/2003 | Bries et al. | 428/343 |
| 2005/0084641 A1 * | 4/2005 | Downs et al. | 428/42.3 |
| 2005/0255275 A1 | 11/2005 | Downs et al. | |
| 2007/0212509 A1 * | 9/2007 | Herbig et al. | 428/40.1 |

FOREIGN PATENT DOCUMENTS

| | | | | |
|---|---|---|---|---|
| DE | 3724528 A1 * | 2/1989 | | C09J 7/02 |
| DE | 19859203 A1 * | 6/2000 | | C09J 7/02 |
| JP | 61-281178 A | 12/1986 | | |
| JP | 1-282049 A | 11/1989 | | |
| JP | 3-128739 A | 5/1991 | | |
| JP | 5-20082 U | 3/1993 | | |
| JP | 5-72430 U | 10/1993 | | |
| JP | 6-007921 U | 2/1994 | | |
| JP | 06-082738 A | 3/1994 | | |
| JP | 2002-331800 A | 11/2002 | | |
| JP | 2003-311842 A | 11/2003 | | |
| JP | 2005-179561 A * | 7/2005 | | |
| JP | 2006-22189 A | 1/2006 | | |
| JP | 2006-348145 A | 12/2006 | | |
| WO | 2005/105442 A1 | 11/2005 | | |

OTHER PUBLICATIONS

Machine Translation of JP 05-072430 U, 1993 (no month).*
Thomson Scientific, London, GB; XP002518392 (Sep. 9, 1990).
Notification, Issued Feb. 28, 2012 by the Japanese Patent Office in counterpart Japanese Application No. 2007-272878.
Office Action, dated Sep. 28, 2012, issued by the State Intellectual Property Office of the P.R.C. in counterpart Chinese Application No. 200810169048.X.
Office Action, dated Oct. 5, 2012, issued by the Japanese Patent Office in counterpart Japanese Application No. 2007-272878.

* cited by examiner

ADHESIVE UNIT FOR EMBLEM, METHOD OF PRODUCING THE SAME, JIG FOR ADHERING EMBLEM AND EMBLEM FOR ADHESION

FIELD OF THE INVENTION

This invention relates to an adhesive unit for emblem, a method of producing the same, a jig for adhering emblem, and an emblem for adhesion. More specifically, it relates to an adhesive unit for emblem to be used in automotive exteriors or the like, a method of producing the same, a jig for adhering emblem to be used in adhering the adhesive unit for emblem to an emblem, and an emblem for adhesion with the use of the adhesive unit for emblem.

BACKGROUND OF THE INVENTION

In the case of adhering an emblem to be used in automotive exteriors or the like to an automobile or the like, it has been a common practice to employ a double-faced adhesive.

As an example of these existing techniques, there has been known a manufacturing method for ornaments and emblems which comprises: the base forming step wherein a base, which is made of the flexible plastic and has a pattern comprising a string of characters or a definite shape formed into a lifted state from the surrounding surface, is formed; the a metal layer forming step wherein a definite metal layer is formed on either one side of the front surface side or the back surface side of the base made of the flexible plastic; the mold-releasing paper attaching step wherein a definite adhesive layer is provided on the back surface side of the base made of the flexible plastic and provided with the metal layer and a definite mold-releasing paper is provided on the front surface of the adhesive layer; and the punching step wherein the pattern section of the base is punched and cut into a state wherein the pattern section is left on the mold-releasing paper (see, JP-A-2002-331800).

Such an existing emblem for adhesion as described above is produced by laminating an emblem material, a double-faced adhesive and a mold-releasing paper and then punching the emblem material and the double-faced adhesive at the same time into a desired shape. Therefore, after the punching, a laminate of the emblem and the double-faced adhesive in the desired shape is adhered to the mold-releasing paper on the surface of the double-faced adhesive opposite to the emblem side and thus the desired positional relationship is maintained. According to this technique, however, it is difficult to punch out a relatively hard emblem material and a relatively soft double-faced adhesive at the same time. Additionally, in the case of punching out an emblem material and a double-faced adhesive at the same time, the emblem piece and the double-faced adhesive piece are inevitably in the same size without having any difference, which brings about problems that when the adhesive unit for emblem is adhered to an adherend surface, the double-faced adhesive piece becomes easily visible from outside so that the appearance is damaged or dust and debris frequently stick thereto. Further, an emblem is usually subjected to a surface-treatment such as plating. In the case where an emblem material, which has been surface-treated prior to punching into a desired shape, a double-faced adhesive and a mold-releasing paper are laminated and then the emblem material and the double-faced adhesive are punched at the same time into a desired shape, since the cutting surface of the emblem is exposed as a non-surface-treated part after the punching, it becomes necessary to surface-treat the exposed part again. Moreover, when the punched emblem piece is surface-treated again, there might arise an additional problem that since the emblem piece and the double-faced adhesive piece have been unified in a desired shape via lamination in the existing technique as described above, the surface-treating agent adheres to the double-faced adhesive piece and thus lowers the adhesive force.

Under these circumstances, the inventors paid their attention to the technique wherein individual emblem pieces each having a desired shape are connected via a runner and adhesive unit for emblem having the desired shape (the adhesive unit including a double-faced adhesive provided with mold-releasing papers on both faces thereof) is adhered to the emblem pieces having been maintained in the mutual positional relationship owing to the runner. According to this technique, the emblem for adhesion thus obtained has a runner by which the individual pieces constituting the emblem are connected to each other so as to maintain the definite positional relationship or posture, which brings about an advantage that the emblem pieces are continuously maintained in the desired positional relationship owing to the runner. Additionally, the emblem pieces and the adhesive unit for emblem respectively having desired shapes are separately obtained and then stuck together. Therefore, it is not necessary to punch out a relatively hard emblem material and a relatively soft double-faced adhesive at the same time. Moreover, it is possible to make a slight difference between the size of the emblem piece and the size of the adhesive unit for emblem so as to make the double-faced adhesive piece invisible from outside or prevent the adhesion of dust and debris. Furthermore, it is possible to adhere an emblem piece, which has a desired shape and is surface-treated, to an adhesive unit for emblem, whereby the difficulties in the surface treatment in the existing techniques as described above can be overcome.

However, the technique as described above suffers from another problem that when the emblem pieces are adhered to the adhesive unit for emblem having been separately produced, highly time-consuming procedures are required in general, i.e., dividing the adhesive unit for emblem into pieces of the respective individual characters or figures by punching out, peeling off the mold-releasing paper, and then adhering the pieces of the adhesive unit for emblem to the emblem pieces that are maintained in a definite positional relationship owing to a runner.

SUMMARY OF THE INVENTION

Accordingly, an object of the invention is to improve the existing technique of adhering an adhesive unit for emblem having been divided into pieces of the respective individual characters or figures to emblem pieces by providing an adhesive unit for emblem whereby the above procedure can be extremely facilitated, a method of producing the same, a jig for adhering emblem and an emblem for adhesion.

The inventors have made intensive studies to solve the above problem. As a result, they have found and confirmed that, by improving the latter existing technique as described above so as to provide an adhesive unit for emblem in which one release film is attached to a face of each of a plurality of double-faced adhesive pieces so that the mutual positional relationship of the plurality of double-faced adhesive pieces can be maintained and another release film is attached to the other face of each of the double-faced adhesive pieces opposite to the face to which the first release film is attached, the adhesive unit for emblem can be handled as a whole while maintaining the positional relationship of the double-faced adhesive pieces each in the shape of a single character or figure, which greatly contributes to the facilitation of the procedures for transfer, adhesion to an emblem, etc., thereby completing the invention.

Accordingly, the present invention provides the following items 1 to 9.

1. An adhesive unit for emblem, which comprises:
   a plurality of double-faced adhesive pieces each having a shape corresponding to a shape of a respective one of a plurality of emblem pieces;
   a first release film attached to a face of each of the plurality of double-faced adhesive pieces to be adhered to an emblem, so that a mutual positional relationship of the plurality of double-faced adhesive pieces is maintained; and
   a second release film attached to the other face of each of the plurality of double-faced adhesive pieces opposite to the face to be adhered to the emblem.

2. The adhesive unit for emblem according to item 1, wherein although the plurality of double-faced adhesive pieces are formed by punching, the second release film has no punching mark.

3. The adhesive unit for emblem according to item 1, wherein each of the plurality of double-faced adhesive pieces has no core base material.

4. The adhesive unit for emblem according to item 1, wherein each of the plurality of double-faced adhesive pieces comprises a cell-containing pressure-sensitive adhesive composition.

5. The adhesive unit for emblem according to item 4, wherein the cell-containing pressure-sensitive adhesive composition contains a hollow microsphere.

6. A method of producing the adhesive unit for emblem according to item 1, the method comprising:
   in a state that the first release film is attached to one adhesive face of a double-faced adhesive tape and a third release film is attached to the other adhesive face of the double-faced adhesive tape, punching out the double-faced adhesive tape together with the third release film to thereby obtain the plurality of double-faced adhesive pieces each having the shape corresponding to the shape of the respective one of the plurality of emblem pieces;
   then peeling off the third release film subjected to the punching; and
   attaching the second release film as a single sheet in common to all of the plurality of double-faced adhesive pieces.

7. A jig for adhering emblem to be used in adhering the adhesive unit for emblem according to item 1 to an emblem,
   the jig having a first surface for placing and fixing the plurality of double-faced adhesive pieces of the adhesive unit for emblem and a second surface for placing and fixing the emblem containing the plurality of emblem pieces maintained in a desired positional relationship by a runner,
   wherein the first and second surfaces are openable and closeable via a hinge,
   wherein the first surface has a convex part for positioning the second release film and a groove for receiving the runner of the emblem,
   wherein the second release film of the adhesive unit for emblem has a hole at the position corresponding to the convex part of the first surface, and
   wherein the second surface has a concave part corresponding to the shape of the emblem.

8. An emblem for adhesion which is formed by using the adhesive unit for emblem according to item 1, the emblem for adhesion comprising:
   an emblem provided with a runner, and
   the plurality of double-faced adhesive pieces adhered to the emblem,
   wherein the second release film is attached to the face of each of the plurality of double-faced adhesive pieces opposite to the face to which the emblem is adhered.

9. The emblem for adhesion according to item 8, wherein although the plurality of double-faced adhesive pieces are formed by punching, the second release film has no punching mark.

According to the adhesive unit for emblem of the invention wherein the positional relationship of the plurality of double-faced adhesive pieces is maintained by attaching to the release film, it is possible to omit the procedure of handling the individual double-faced adhesive pieces each in the shape of a single character or figure one by one as in the existing techniques, which greatly contributes to the facilitation of the procedures for transfer, adhesion to an emblem, etc.

According to the method of producing an adhesive unit for emblem of the invention, the adhesive unit for emblem as described above can be easily obtained.

According to the jig for adhering emblem of the invention, the adhesive unit for emblem as described above can be accurately positioned on the first surface and the emblem can also be accurately positioned on the second surface. Thus, by adhering the first surface tightly to the second surface by the hinge, the adhesive unit for emblem can be very accurately and easily adhered to the emblem.

According to the emblem for adhesion of the invention, the positional relationship of the double-faced adhesive pieces is maintained due to the bonding to the release film and the positioning is also maintained by the runner even after peeling off the release film. Thus, the procedure of handling the individual pieces each in the shape of a single character or figure one by one can be omitted in transfer or adhesion to an automobile or the like.

Namely, the adhesive unit for emblem according to the invention is appropriately usable, for example, as an adhesive unit to be adhered to an emblem for adhesion that is employed for adhering an emblem to an automobile or the like. The method of producing an adhesive unit for emblem according to the invention is appropriately usable in producing the adhesive unit for emblem as described above. The jig for adhering emblem according to the invention is appropriately usable in adhering the adhesive unit for emblem as described above to an emblem. The emblem for adhesion according to the invention is appropriately usable in adhering an emblem to an automobile or the like.

DESCRIPTION OF THE REFERENCE NUMERALS AND SIGNS

1 adhesive unit for emblem
11 double-faced adhesive piece 12 second release film
13 first release film
2 jig for adhering emblem
21 upper surface
22 lower surface
24 groove
3 emblem
31 emblem piece
32 runner
4 positioning plate
5 hinge
51 hinge shaft
52 spring

DETAILED DESCRIPTION OF THE INVENTION

Next, the invention will be described in greater detail. However, it is to be understood that the scope of the invention is not restricted thereto and modification may be made in the embodiments and examples without departing from the scope of the invention.

Adhesive Unit for Emblem

<Double-Faced Adhesive Piece>

The adhesive unit for emblem according to the invention contains a plurality of double-faced adhesive pieces.

Each double-faced adhesive piece, the one face of which is to be adhered to an emblem while the other face thereof is to be adhered to an automobile or the like, is employed for adhering the emblem to the automobile or the like. Each double-faced adhesive piece is in the shape of a single character or figure. As will be described hereinafter, such double-faced adhesive piece can be produced by punching out a strip-shaped double-faced adhesive tape into a plurality of double-faced adhesive pieces each having a shape corresponding to a respective one of a plurality of emblem pieces.

The double-faced adhesive piece as described above is not particularly restricted. For example, use may be made of either a double-faced adhesive piece having a base material, in which adhesive layers are formed on both faces of a core base material such as a nonwoven fabric, a paper, a plastic film or a metal foil, or a double-faced adhesive piece formed of an adhesive layer alone without any core base material (i.e., a base-free double-faced adhesive piece). A base-free double-faced adhesive piece having no core base material is preferred because of showing a stronger adhesive force to an adherend such as an automobile.

As the adhesive layer of the base-free double-faced adhesive piece, an adhesive layer formed of a cell-containing pressure-sensitive composition is preferred. The cell content is preferably, for example, 10 to 50% by volume based on the total cell-containing pressure-sensitive composition, more preferably 11 to 45% by volume and still more preferably 12 to 40% by volume, though the invention is not restricted thereto.

As the cell-containing pressure-sensitive composition, use may be made of, for example, a cell-containing viscoelastic composition disclosed in JP-A-2005-179561 or JP-A-2006-22189. It is particularly preferable to use a cell-containing pressure-sensitive composition containing a hollow microsphere. It is still preferable to use a hollow glass balloon as the hollow microsphere. Use of such a cell-containing pressure-sensitive composition containing a hollow microsphere, in particular, hollow glass balloon makes it possible to elevate the adhesiveness of the double-faced adhesive piece and improve the cutting properties in the punching step.

It is preferable that a thickness of a double-faced adhesive piece is, for example, 0.2 to 4.0 mm and more preferably 0.4 to 2.0 mm, though the invention is not restricted thereto.

<Release Film>

Release films are used in order to protect both faces of each of double-faced adhesive pieces.

The first and second release films to be attached to both faces of each of the double-faced adhesive pieces may be either the same or different ones and it is preferred that kinds of the first and second release films are different. More specifically, the first release film attached to a face of each of the double-faced adhesive pieces to be adhered to an emblem is preferably an easily peelable release film, while the second release film attached to the other face of each of the double-faced adhesive pieces to be adhered to a surface of an adherend such as an automobile is preferably a hardly peelable film. The reason why it is preferred to use two different kinds of release films is as follows. Considering the fact that first release film is to be peeled off from the double-faced adhesive pieces in the step of adhering the double-faced adhesive pieces to an emblem while the second release film is to be peeled off from the double-faced adhesive pieces in the step of adhering the double-faced adhesive pieces to an surface of an adherend such as an automobile and that the step of adhering the double-faced adhesive pieces to the emblem is firstly conducted and the step of adhering the double-faced adhesive pieces to the surface of the adherend such as an automobile is subsequently conducted, the first release film attached to the face of each of the double-faced adhesive pieces to be adhered to the emblem needs no strong peeling strength, while the second release film attached to the other face of each of the double-faced adhesive pieces to be adhered to the surface of the adherend such as an automobile should have a strong peeling strength.

Since the second release film is preferably being hardly peelable, it is preferable that it has no punching mark so that it can be smoothly peeled off from the double-faced adhesive pieces. When the second release film has a punching mark, it is feared that a small portion of the double-faced adhesive piece enters into the punching mark and thus causes excessive stress in the peeling step so that the second release film is broken or a part of the double-faced adhesive piece is disrupted. To obtain such a second release film having no punching mark, it is preferable to employ a method including, for example, while attaching the first release film and another release film (third release film) to both adhesive faces of a double-faced adhesive tape, punching out the double-faced adhesive tape together with the third release film adhered to one adhesive surface of the double-faced adhesive tape to obtain a plurality of double-faced adhesive pieces each having a shape corresponding to a shape of a respective one of a plurality of emblem pieces, peeling off the third release film subjected to the punching, and adhering, the second release film as a single sheet in common to all of the double-faced adhesive pieces, as will be discussed in detail concerning the method of producing an adhesive unit for emblem.

The first and second release films are not particularly restricted. Use may be made of a release film having a base material (for example, a paper such as high-quality paper, craft paper or glassine paper; a plastic film made of a polyethylene such as high-density polyethylene, low-density polyethylene or linear low-density polyethylene, nylon, polyester, polypropylene, poly-4-methyl-1-pentene, polystyrene or polyvinyl chloride; or a metal foil such as an aluminum foil or a stainless foil) coated with a silicone-based release agent, a fluorinated release agent, a long-chain alkyl-based release agent or the like. The base material may be a mixture or a laminate of multiple materials as cited above. In particular, a base material containing a polyester, polypropylene, polyethylene or the like in its constitution is preferable. In the case of using a polyester film as the base material, a polyethylene terephthalate film is preferred. A base material having releasing properties (for example, a film made of high-density polyethylene, low-density polyethylene, linear low-density polyethylene, polypropylene, poly-4-methyl-1-pentene or fluoroplastic polymer) is usable as a release film per se without the necessity of coating with a release agent as cited above.

It is preferable that the thickness of the first release film is, for example, 0.025 to 0.20 mm, more preferably 0.03 to 0.15 mm and still more preferably 0.05 to 0.13 mm. In the case where the thickness of the first release film is less than 0.025 mm, it becomes difficult to adjust the cutting depth of a cutting blade so as to prevent the first release film from cutting together with the double-faced adhesive tape in the step of punching out the double-faced adhesive tape into pieces each having a shape corresponding to a respective one of the emblem pieces. Also, it is feared that the first release film can be hardly peeled off from the double-faced adhesive pieces in the step of adhering the double-faced adhesive pieces to the emblem. In the case where the thickness of the first release film exceeds 0.20 mm, on the other hand, a larger amount of the release film material is required with an increase in the thickness, which might bring about not only an increase in the cost but also an increase in the environmental load for disposal, etc.

It is preferable that the thickness of the second release film is, for example, 0.05 to 0.20 mm and more preferably 0.07 to 0.18 mm. In the case where the thickness of the second release film is less than 0.05 mm, it is feared that the second release film can be hardly peeled off from the double-faced adhesive pieces in the step of adhering the emblem for adhesion to an automobile or the like. In the case where the thickness of the second release film exceeds 0.20 mm, on the other hand, a larger amount of the release film material is required with an increase in the thickness, which might bring about not only an increase in the cost but also an increase in the environmental load for disposal, etc.

<Structure of Adhesive Unit for Emblem>

Figure 1:
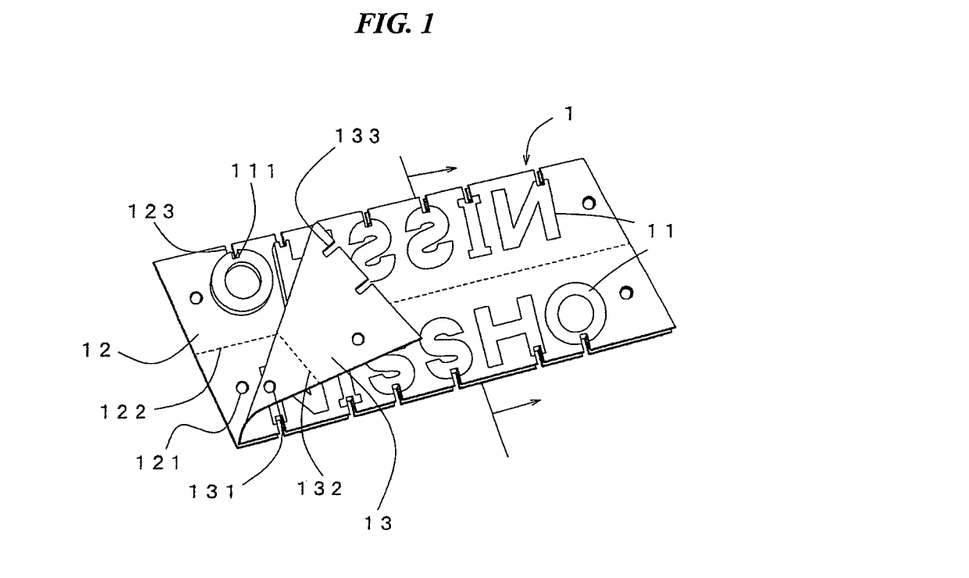
FIG. 1 is a perspective view which shows an embodiment of the adhesive unit for emblem according to the invention.
Figure 2:
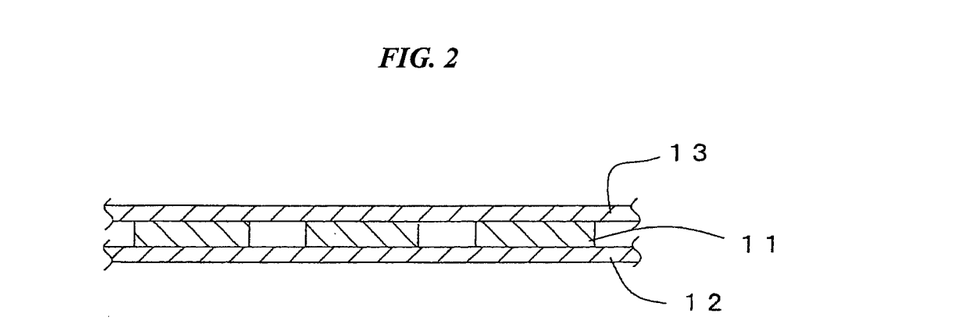
FIG. 2 is a sectional view which shows an embodiment of the adhesive unit for emblem according to the invention.

FIGS. 1 and 2 show an embodiment of the structure of an adhesive unit for emblem. As FIG. 1 shows, double-faced adhesive pieces 11 each has a shape corresponding to a respective one of emblem pieces. To form an emblem "NISSHO", more specifically speaking, these double-faced adhesive pieces each has a shape corresponding to the shape of the respective one of the emblem pieces, namely, "N", "I", "S", "S", "H" and "O". FIG. 2 shows the cutting surface of a part of the emblem shown in FIG. 1 (more specifically, the cutting surface of the emblem piece "S"). As FIG. 2 shows, a second release film 12 and a first release film 13 are provided on both surfaces of each double-faced adhesive piece 11. Since the second release film 12 and the first release film 13 are attached to each of the double-faced adhesive pieces 11, the mutual positional relationship of the double-faced adhesive pieces 11 is maintained.

In the adhesive unit for emblem 1 shown in FIG. 1, a punch hole 121 is formed in the second release film 12 and a punch hole 131 is formed in the first release film 13, respectively. These punch holes 121 and 131 are formed for positioning the adhesive unit for emblem 1, for example, by fixing the adhesive unit to one surface of a jig for adhering emblem as will be described hereinafter. A groove 111 formed in the double-faced adhesive piece, a groove 123 formed in the second release film 12 and a groove 133 formed in the first release film 13 are provided for receiving a runner that is provided with an emblem for connecting the emblem pieces together.

Further, it can be seen that there are two sets of double-faced adhesive pieces respectively corresponding to the emblems composed of characters "NISSHO" in the embodiment shown in FIG. 1. Namely, it is not always necessary to employ only a single set of double-faced adhesive pieces for an emblem but two or more sets may be prepared as the double-faced adhesive pieces maintained in a mutual positional relationship owing to the second release film 12 and the first release film 13. By preparing two or more sets of double-faced adhesive pieces, it consequently becomes possible to handle a larger number of double-faced adhesive pieces together and thus the handling properties in transferring the adhesive unit or adhering the adhesive unit to the emblem can be further improved. In this case, it is preferable to provide a separating means 122 such as perforations as shown in FIG. 1 so that the individual emblem sets for adhesion can be separated from each other after adhering the double-faced adhesive pieces to the emblem pieces.

Production of Adhesive Unit for Emblem

The adhesive unit for emblem according to the invention can be produced by, for example, the following method.

In a state that the first release film is attached to one adhesive face of a double-faced adhesive tape and a third release film is attached to the other adhesive face of the double-faced adhesive tape, the double-faced adhesive tape is punched out together with the third release film to thereby obtain double-faced adhesive pieces each having a shape corresponding to a shape of a respective one of the emblem pieces.

Namely, between the two release films adhered to the double-faced adhesive tape, the third release film attached on the side to be subjected to punching is punched out together with the double-faced adhesive tape into pieces each having a shape corresponding to the shape of the respecitive one of the emblem pieces, while the first release film provided on the other side of the double-faced adhesive tape opposite to the side to be subjected to punching is not punched out together with the double-faced adhesive tape. This can be achieved by, for example, adjusting the cutting depth of a cutting blade. The first release film which is not subjected to punching serves as a release film adhered to the face of the adhesive unit for emblem to be adhered to an emblem. As described above, it is therefore preferred to use an easily peelable film as the first release film.

In the punching step, it is preferable to polish the edge of the cutting blade to the extent of, for example, 10 to 20 µm. Thus, the double-faced adhesive pieces are separated at a sufficient distance from cutting shavings after punching out the double-faced adhesive tape, which makes it possible to prevent blocking caused by the double-faced adhesive pieces and the shavings. It is also possible to prevent the cutting blade from invading the first release film on the side opposite to the side to be subjected to punching.

Next, the third release film subjected to the punching is peeled off and then the second release film as a single sheet is adhered in common to all of the double-faced adhesive pieces. The second release film to be finally adhered to the side of each of the double-faced adhesive pieces subjected to punching serves as a release film which is attached to the face of the adhesive unit for emblem to be adhered to a surface of an adherend such as an automobile. Therefore, it is preferable to use a hardly peelable film as the second release film as described above.

In the adhesive unit for emblem thus obtained, the first release film is attached to one face of each of the double-faced adhesive pieces each having a shape corresponding to the shape of the respective one of the emblem pieces so that the mutual positional relationship of the double-faced adhesive pieces can be maintained, and the second release film is attached to the other face of each of the double-faced adhesive pieces opposite to the face to which the first release film is attached. At the point of completing the steps as described above, the strip-shaped first and second release film are attached to both faces of each of the double-faced adhesive pieces. Therefore, the double-faced adhesive pieces may be cut in a desired size referring a string of characters or figures (for example, the string of characters "NISSHO" in FIG. 1) as to a unit. In the case of using a jig for adhering emblem as will be described hereinafter, an additional treatment such as punching may be conducted if necessary. That is, a hole may be formed in the release film at the position corresponding to the convex part for positioning the release film that has been formed in the first surface of the jig in order to place and fix the double-faced adhesive pieces of the adhesive unit for emblem.

According to the method as described above, the second release film to be finally adhered to the side of the double-faced adhesive piece to be subjected to punching never comes into contact with the cutting blade that is employed in punching and, therefore, has no punching mark. As a result, it is possible to avoid the occurrence of the problem that a small portion of the double-faced adhesive piece enters into the punching mark and thus causes excessive stress in the peeling step so that the second release film is broken or a part of the double-faced adhesive piece is disrupted.

On the other hand, the first release film having been adhered to the side of the double-faced adhesive piece not to be subjected to punching may come into contact with the cutting blade in the punching step. Thus, it has a punching mark in some cases. However, the formation of a deep cutting mark can be prevented by preliminarily polishing the edge of the cutting blade to be used for punching as described above. By using an easily peelable film as the first release film that is attached to the face of the double-faced adhesive piece to be adhered to the emblem as described above, strong stress never arises in the peeling step even in the case where a part of the double-faced adhesive piece invades the punching mark.

Jig for Adhering Emblem

The jig for adhering emblem according to the invention is a jig to be used for adhering the adhesive unit for emblem as described above to an emblem. Next, the structure and function thereof will be described in greater detail by referring to drawings.

Figure 3:
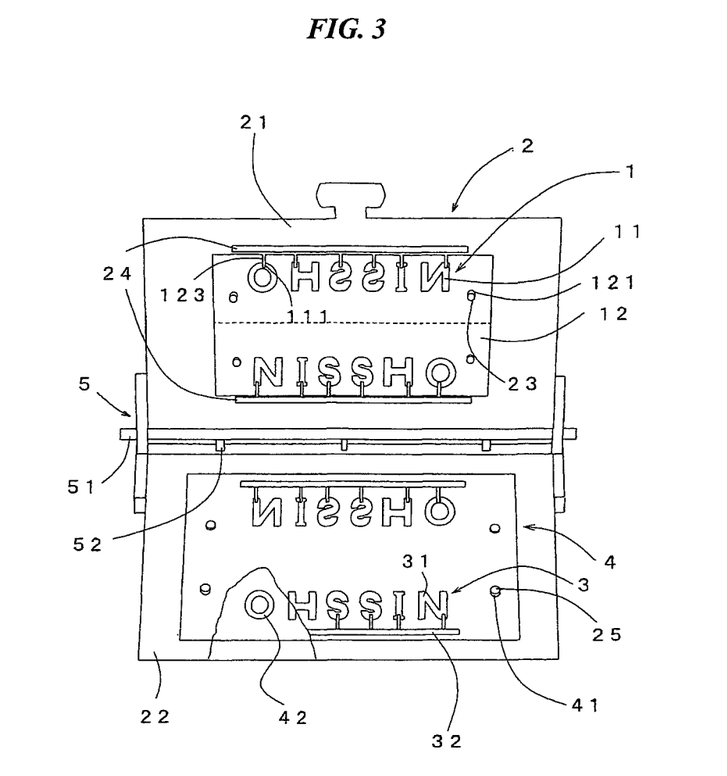
FIG. 3 is a perspective view which shows an embodiment of the jig for adhering emblem according to the invention.

FIG. 3 is a perspective view of an embodiment of a jig for adhering emblem.

On the upper surface 21 of a jig for adhering emblem 2, an adhesive unit for emblem 1 is placed and fixed, while an emblem 3 is placed on the lower surface 22 of the jig for adhering emblem 2. By tightly adhering the upper surface 21 to the lower surface 22, the adhesive unit for emblem 1 is adhered to the emblem 3. To adhere to the emblem 3, the first release film of the adhesive unit for emblem 1 on the side to be tightly adhered to the emblem 3 has been preliminarily peeled off.

The adhesive unit for emblem 1 can be placed and fixed to the upper surface 21 of the jig for adhering emblem 2 by passing a convex part 23 formed on the upper surface 21 of the jig for adhering emblem 2 through a hole 121 formed in the second release film 12 of the adhesive unit for emblem 1.

In the emblem 3, on the other hand, emblem pieces 31 respectively having the shapes of desired characters or figures (six characters N, I, S, S, H and O in FIG. 3) are maintained in a desired positional relationship owing to a runner 32 (the six characters are arranged in a horizontal line in FIG. 3).

Grooves 24, 111 and 123 for receiving the runner of the emblem are formed respectively on the upper surface 21 of the jig for adhering emblem 2, the double-faced adhesive piece 11 and the second release film 12. Owing to this constitution, the obstruction of the adhesion between the adhesive unit for emblem 1 and the emblem 3 by the runner 32 can be avoided. Moreover, there is an additional advantage that as the runner 32 of the emblem 3 passes through the groove 24 formed on the upper surface 21 of the jig for adhering emblem 2, the position of the emblem 3 can be further fixed.

In the embodiment shown in FIG. 3, a positioning plate 4 is further provided for the accurate positioning of the emblem 3. In the positioning plate 4, a hole 41, through which a convex part 25 formed on the lower surface 22 of the jig for adhering emblem 2 passes for accurately positioning the positioning plate 4 per se, is formed and a concave part 42 having a shape corresponding to the emblem 3 is further provided to perform a function of positioning the emblem 3 by setting the emblem 3 in this concave part 42. As the positioning plate 4, it is recommended to use an acryl plate or the like which can be easily molded into a shape having the hole 41 and the concave part 42.

Figure 4:
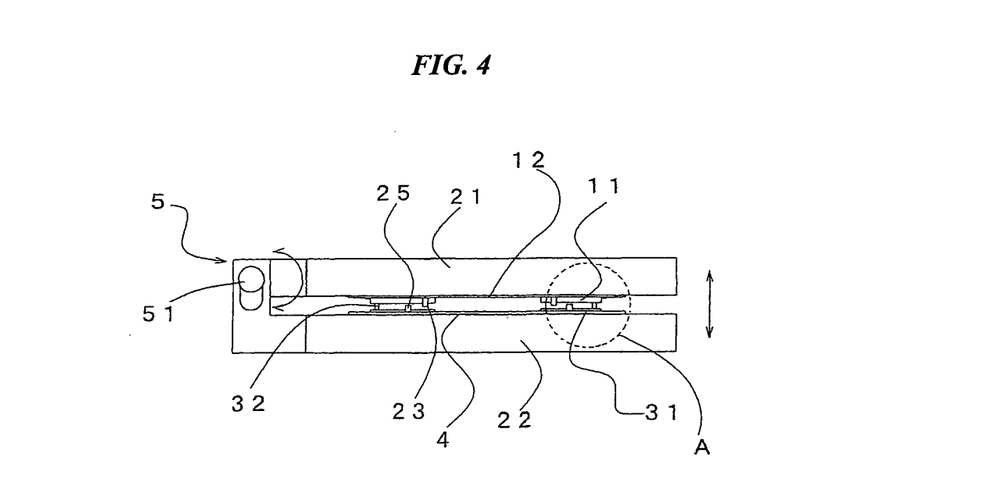
FIG. 4 is a side view which shows an embodiment of the jig for adhering emblem according to the invention.
Figure 5:
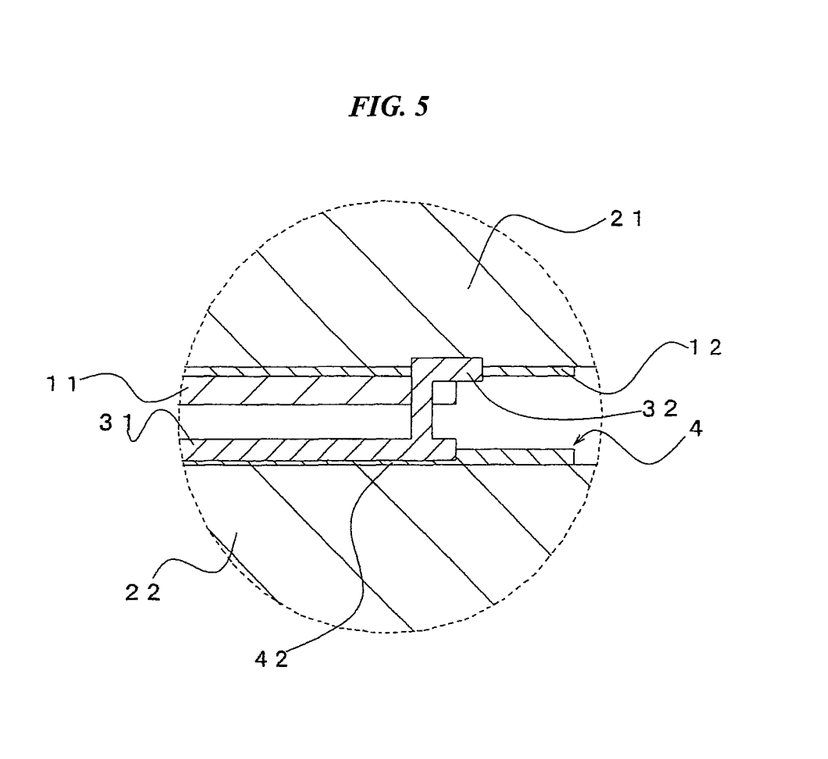
FIG. 5 is an enlarged sectional side view which shows a part of an embodiment of the jig for adhering emblem according to the invention.

It is still preferable that the jig for adhering emblem according to the invention has a structure that is illustrated in detail in FIGS. 4 and 5. More specifically, a hinge 5 is provided as shown in FIG. 4 in such a manner that when the upper surface 21 is tilted toward the lower surface 22 until the upper surface 21 becomes parallel to the lower surface 22, it is movable in the vertical direction (i.e., being perpendicular to the upper and lower faces). That is, when the upper surface 21 is tilted toward the lower surface 22, these surfaces are not adhered tightly to each other immediately, but the hinge shaft 51 is vertically movable and its up-and-down movements are controlled by a spring 52 shown in FIG. 3, so that the upper surface is once lifted up (as shown in FIG. 4) and after that, these surfaces are first adhered tightly to each other due to a downward pressing force.

FIG. 5, which is an enlarged sectional view of the part shown in FIG. 4., indicates that an emblem piece 31 is accurately positioned by a concave part 42 that has a shape corresponding to the shape of the emblem piece 31.

As described above, use of this jig for adhering emblem makes it possible to accurately position the adhesive unit for emblem and the emblem and thus the adhesive unit for emblem can be stably and tightly adhered to the emblem by perpendicularly superposing the upper surface with the lower surface. As a result, adhesion can be conducted at a much higher accuracy than in a hand-operated case. Since there has been known hitherto no such adhesive unit for emblem as the one according to the invention wherein accurate positioning is made by the release films, it has been a common practice to separately adhere the individual characters or figures to emblem pieces. Accordingly, in such an existing technique, it is highly difficult to adhere an adhesive unit for emblem to an emblem piece. In the case of a double-faced adhesive piece being made of a relatively soft material and having a complicated character or figure shape (for example, the double-faced adhesive piece in the shape "S" as shown in FIG. 3), the double-faced adhesive piece becomes distorted in various directions, which makes it further difficult to adhere the double-faced adhesive piece to an emblem piece while appropriately sustaining its shape. Additionally, in the case where a double-faced adhesive piece having a somewhat smaller size than an emblem piece is used so as to improve the appearance and avoid the adhesion of dust and debris thereto, for example, in the case where a space of about 0.5 mm is to be provided between the outer periphery of the double-faced adhesive piece and the outer periphery of the emblem piece with regard to respective characters or figures, it is almost impossible to accurately adhere the double-faced adhesive piece to the emblem piece by hand. Under these circumstances, the invention has solved all of these problems at once.

Although the adhesive unit for emblem and the emblem are placed and fixed respectively on the upper and lower surfaces in the above-described embodiment, it is also possible to place and fix the emblem on the upper surface and the adhesive unit for emblem on the lower surface.

Emblem for Adhesion

The emblem for adhesion according to the invention is formed by using the adhesive unit for emblem as described above, and it includes an emblem provided with a runner, and double-faced adhesive pieces adhered to the emblem, in which the second release film is adhered to the face of each of the double-faced adhesive pieces opposite to the face to which the emblem is adhered.

Figure 6:
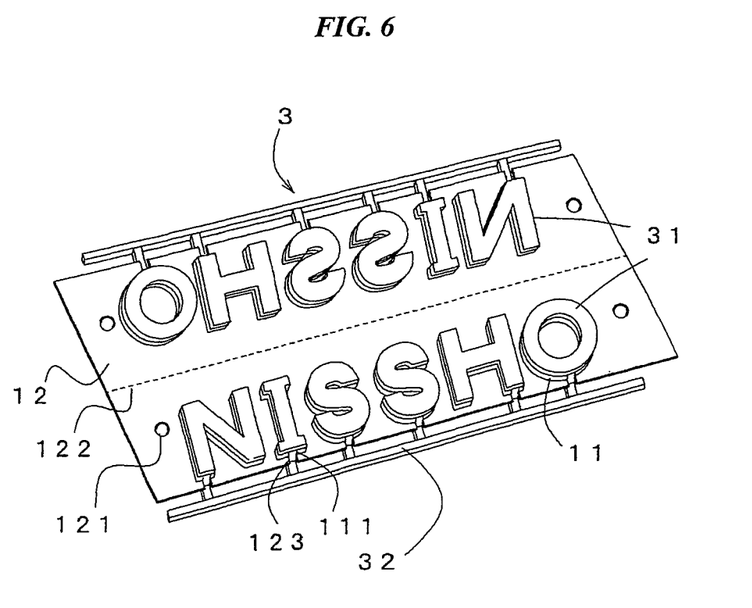
FIG. 6 is a perspective view which shows an embodiment of the emblem for adhesion according to the invention.

FIG. 6 shows an embodiment of specific structure of the emblem for adhesion, in which double-faced adhesive pieces 11 each having a desired shape are adhered to emblem pieces 31 and the second release film 12 is adhered to the face of each of the double-faced adhesive pieces 11 opposite to the face to which the emblem pieces are adhered.

The emblem pieces 31 are connected together by a runner 32 to form an emblem 3 having a string of characters (i.e., the six characters "NISSHO" in FIG. 6). The double-faced adhesive pieces 11 and the second release film 12 respectively have grooves 111 and 123 for allowing the runner 32 to pass through. Owing to this runner 32, the positional relationship of the emblem pieces 31 can be maintained even after peeling off the second release film 12. Although two sets of a string of characters "NISSHO" are formed on a single second release film of the emblem for adhesion shown in FIG. 6, these sets can be easily separated from each other by a separating means 122 formed on the second release film 12.

As described above, it is preferable to use a hardly peelable film as the second release film 12. However, it is undesirable that excessive stress arises in the course of the peeling so that the second release film 12 is broken or a part of the double-faced adhesive piece 11 is disrupted. Therefore, it is preferable that the second release film 12 adhered to the face of each of the double-faced adhesive pieces 11 has no punching mark. Thus, the invasion of a part of the double-faced adhesive piece 11 into the punching mark can be avoided and, therefore, the above-mentioned problems can be prevented.

While the present invention has been described in detail and with reference to specific embodiments thereof, it will be apparent to one skilled in the art that various changes and modifications can be made therein without departing from the scope thereof.

This application is based on Japanese patent application No. 2007-272878 filed Oct. 19, 2007, the entire contents thereof being hereby incorporated by reference.

Further, all references cited herein are incorporated in their entireties.

What is claimed is:

1. An adhesive unit for an emblem, with comprises:
a plurality of double-faced adhesive pieces each having a pre-determined shape; a first release film attached to a first face of each of the plurality of double-faced adhesive pieces so that a mutual positional relationship of the plurality of double-faced adhesive pieces is maintained; and a second release film attached to a second face of each of the plurality of double-faced adhesive pieces opposite to the first face,
wherein the periphery of the predetermined shape of each double-faced adhesive piece is a character or a figure, and the double-faced adhesive pieces are part of a predetermined string of characters and/or figures,
wherein each of the plurality of the double-faced adhesive pieces has a groove and the first release film and the second release film each have a plurality of corresponding grooves, wherein each groove in each of the plurality of double-faced adhesive pieces corresponds to one of the plurality of corresponding grooves in the first release film and in the second release film,
wherein the grooves and corresponding grooves are formed as cuts into the periphery of each double-faced adhesive piece and the first release film and the second release film, respectively,
wherein each groove and its corresponding grooves are aligned through the respective double-faced adhesive piece, the first release film, and the second release film,
wherein the grooves are adapted for receiving a runner that is provided with an emblem.

2. The adhesive unit for an emblem according to claim 1, wherein although the plurality of double-faced adhesive pieces are formed by punching, the second release film has no punching mark.

3. The adhesive unit for an emblem according to claim 1, wherein each of the plurality of double-faced adhesive pieces has no core base material.

4. The adhesive unit for an emblem according to claim 1, wherein each of the plurality of double-faced adhesive pieces comprises a cell-containing pressure-sensitive adhesive composition.

5. The adhesive unit for an emblem according to claim 4, wherein the cell-containing pressure-sensitive adhesive composition contains a hollow microsphere.

6. A method of producing the adhesive unit for an emblem according to claim 1, the method comprising:
in a state that the first release film is attached to one adhesive face of a double-faced adhesive tape and a third release film is attached to the other adhesive face of the double-faced adhesive tape, punching out the double-faced adhesive tape together with the third release film to thereby obtain the plurality of double-faced adhesive pieces each having the shape corresponding to the shape of the respective one of the plurality of emblem pieces;
then peeling off the third release film subjected to the punching; and
attaching the second release film as a single sheet in common to all of the plurality of double-faced adhesive pieces.

7. A jig for adhering an emblem to be used in adhering the adhesive unit for an emblem according to claim 1 to an emblem comprising:
the jig having a first surface for placing and fixing the plurality of double-faced adhesive pieces of the adhesive unit for emblem and a second surface for placing and fixing the emblem containing the plurality of emblem pieces maintained in a desired positional relationship by a runner,
wherein the first and second surfaces are openable and closeable via a hinge,
wherein the first surface has a convex part for positioning the second release film and a groove for receiving the runner of the emblem, wherein the second release film of the adhesive unit for emblem has a hole at the position corresponding to the convex part of the first surface, and wherein the second surface has a concave part corresponding to the shape of the emblem.

8. An emblem for adhesion which is formed by using the adhesive unit for an emblem according to claim 1, the emblem for adhesion comprising:

an emblem provided with a runner, and the plurality of double-faced adhesive pieces adhered to the emblem, wherein the second release film is attached to the face of each of the plurality of double-faced adhesive pieces opposite to the face to which the emblem is adhered.

9. The emblem for adhesion according to claim 8, wherein although the plurality of double-faced adhesive pieces are formed by punching, the second release film has no punching mark.

\* \* \* \* \*